(12) United States Patent
Forman et al.

(10) Patent No.: US 9,430,562 B2
(45) Date of Patent: Aug. 30, 2016

(54) CLASSIFIER INDEXING

(75) Inventors: George Forman, Port Orchard, WA (US); Shyamsundar Rajaram, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2212 days.

(21) Appl. No.: 12/242,752

(22) Filed: Sep. 30, 2008

(65) Prior Publication Data

US 2010/0082642 A1  Apr. 1, 2010

(51) Int. Cl.
*G06F 17/30* (2006.01)

(52) U.S. Cl.
CPC .............................. *G06F 17/30705* (2013.01)

(58) Field of Classification Search
None
See application file for complete search history.

(56) References Cited

U.S. PATENT DOCUMENTS

| 7,593,903 B2 * | 9/2009 | Forman et al. ............... 706/12 |
| 2002/0174095 A1 * | 11/2002 | Lulich et al. .................... 707/1 |
| 2007/0244882 A1 * | 10/2007 | Cha et al. ........................ 707/5 |

\* cited by examiner

*Primary Examiner* — Miranda Huang
(74) *Attorney, Agent, or Firm* — Trop, Pruner & Hu, P.C.

(57) ABSTRACT

Provided are, among other things, systems, methods and techniques for document-based processing. In one implementation, a document is input; features are extracted from it; an index is queried using at least a subset of the extracted features and, in response, identifications for selected document classifiers are received from a larger pool of document classifiers; the document is processed using individual ones of the selected document classifiers, thereby generating corresponding classifier outputs; and then, based on such classifier outputs, (1) the document is categorized within a computer database and/or (2) feedback information is provided to a user.

24 Claims, 6 Drawing Sheets

CLASSIFIER INDEXING

CROSS REFERENCE TO RELATED APPLICATIONS

This Application claims the benefit under 35 U.S.C. §119(e) of U.S. Provisional Application Ser. No. 61/024,154, filed Jan. 28, 2008, entitled "CLASSIFIER INDEXING."

FIELD OF THE INVENTION

The present invention pertains to systems, methods and techniques for using a classifier index, e.g., to categorize documents or other kinds of information, to make decisions based on such information, to control processes and/or to provide user feedback information.

BACKGROUND

A variety of different techniques exist for categorizing or classifying documents. One kind of classification technique uses a supervised classifier, such as Support Vector Machine (SVM) or Naïve Bayes. Generally speaking, supervised classifiers input feature vectors for a number of labeled training samples, i.e., labeled as to whether or not they belong to a category. Then, based on such training information, the classifier generates a function for mapping an arbitrary feature vector into a decision as to whether or not the corresponding document belongs in the category. When a new unlabeled document or other object (or, more specifically, its feature vector) is input, the function is applied to determine whether the object belongs in the category.

However, such conventional techniques often have drawbacks. For example, most conventional techniques often are inadequate when there are a large number of potential categories and processing time is an important factor, either because some action must be taken in real time or because a large number of documents must be processed.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
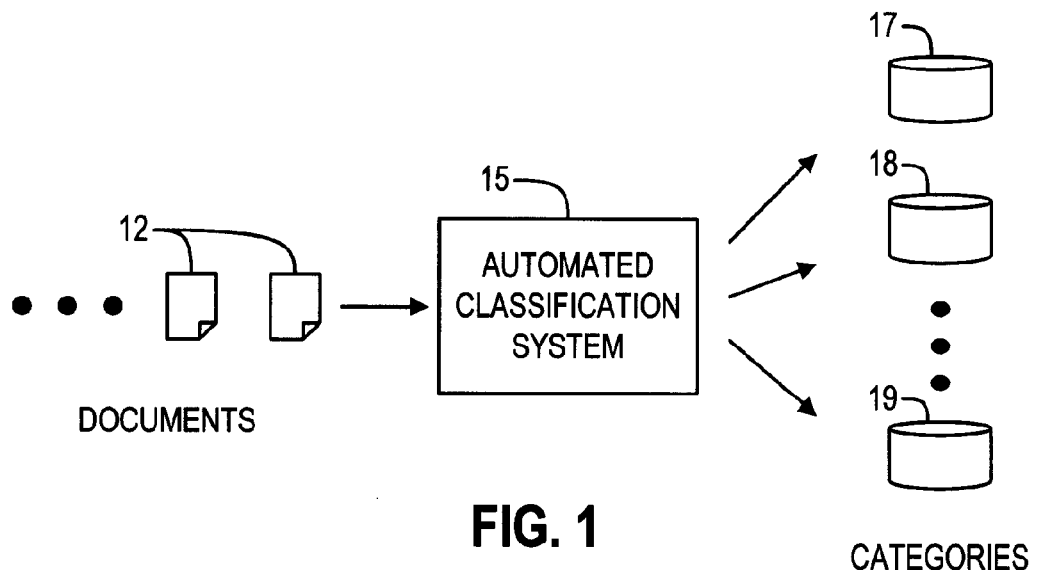
FIG. 1 is a block diagram illustrating a first representative context in which the present invention can operate.

FIG. 1 is a block diagram illustrating a first representative context in which the present invention can operate. Here, a sequence of documents 12 is to be categorized, using automated classification system 15, into appropriate categories from a variety of different available categories 17-19. For instance, such a situation might arise where a large number of text documents are to be categorized based on their content. In one specific example, articles and stories on the World Wide Web continually are categorized as such new documents are made available on the Web, using a document classification system such as the Dewey Decimal Classification system. In other words, in this context a potentially unlimited stream of documents 12 are classified into appropriate categories, the total number of categories 17-19 potentially being in the hundreds, thousands or even tens of thousands.

The techniques employed by automated classification system 15, e.g., where there are a large number of potential categories, are subjects of the present invention and are discussed in more detail below. Generally speaking, however, classification system 15 typically includes one or more classifiers for each of the categories 17-19. Preferably, such classifiers are binary classifiers (i.e., each making a decision about a single category) that also output a score indicating the degree to which an input object matches the corresponding category. In order to avoid classifying all of the documents 12 using all of the potential classifiers within system 15, the preferred embodiments of the present invention use a classifier index, again as described in more detail below.

The actual categorization of a document 12 can take many forms. For example, documents belonging to different categories 17-19 can be physically separated based on their corresponding categories. More commonly, however, each of the documents 12 is tagged with codes indicating any categories to which it belongs, e.g., then using an index to allow a user to quickly find documents belonging to a particular category, or to post topical news articles on particular web pages. This approach generally provides greater flexibility and eliminates redundant storage where a single document can be designated as belonging to more than one category (e.g., fiction, early $20^{th}$ century, suspense).

Figure 2:
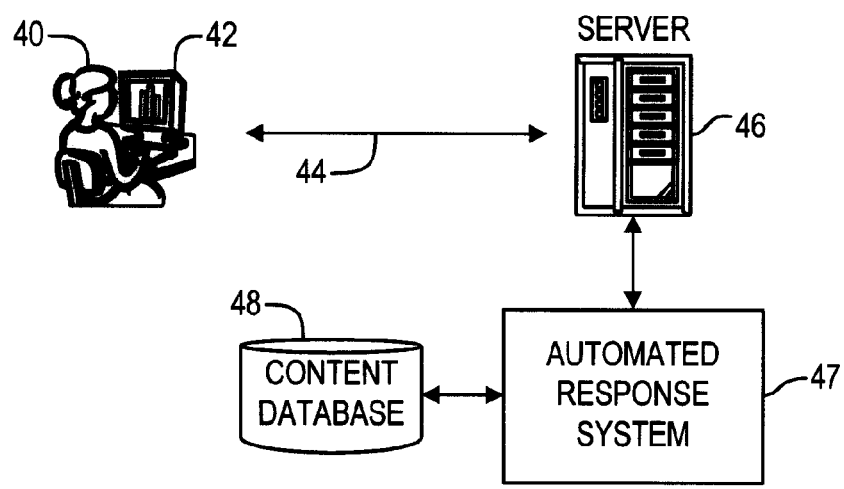
FIG. 2 is a block diagram illustrating a second representative context in which the present invention can operate.

FIG. 2 is a block diagram illustrating a second representative context in which the present invention can operate. Here, a user 40 operates her computer 42 in order to communicate 44 (e.g., via the Internet) with a server 46. For example, the user 40 might be visiting a website, hosted by server 46, that provides Web-based e-mail or, alternatively, might be using a search engine hosted by server 46. Still further, the user 40 might be visiting a social networking site, a site that presents a virtual world or any other kind of online site. In any event, the user 40 enters or otherwise inputs information into her computer 42, and that information is then communicated to server 46.

Upon receiving such information, it often is desirable for server 46 to immediately provide relevant content to the user 40, based on the received information. For example, in addition to returning search results in response to a submitted search-engine query, it often is advantageous if server 46 simultaneously can deliver relevant advertising, e.g., relevant to the user 40 based on the current query alone or based on the current query in combination with other information previously submitted by the user 40. Similarly, it often is preferable to target advertising in a similar manner in other contexts as, e.g., based on current and/or previous e-mail communications. In addition to advertising, it often is desirable to customize various other aspects of the server-provided online content based on information provided by the user 40.

Thus, server 46 preferably interacts with an automated response system 47 that selects an appropriate chunk of content (e.g., a banner advertisement or other kind of advertisement) from a database 48 of available content. Preferably, system 47 implements a technique according to the present invention which categorizes the received information and selects the data chunk from database 48 based on the resulting category or categories. In such embodiments, the available chunks within database 48 preferably have assigned categories (e.g., with each chunk having its own category) and system 47 preferably uses classifiers that have been trained on such categories, as discussed in more detail below.

In any event, upon selecting the appropriate chunk, automated response system 47 preferably provides it to server 46 which, in turn, incorporates it into the other information (e.g., a webpage) that is being provided back to computer (or other networked device) 42.

It is noted that whatever information is provided by device 42 (either alone or in combination with other information that is to be evaluated by automated response system 47) can be packaged as, and considered to be, a "document", similar to any of documents 12. Accordingly, much of the classification processing performed by automated response system 47 can be identical, or at least substantially similar, to the classification processing performed by system 15. However, rather than classifying a document for future use, the main goal of system 47 typically is to use the classification results for the immediate short-term purpose of selecting content to be delivered at the present moment (or in the very near term). It is noted that such real-time delivery of information can be useful for interactions between automated processes, as well as between a person and a server 46. In other words, although user 40 is indicated as being a person in the present example, in other embodiments user 40 is an automated process or device.

It is further noted that the term "document", as used herein, is intended to be construed broadly to include not only entire files (e.g., as typically recognized by a computer file system), but any designated chunk of information, such as a designated portion of a file and/or portions of information from different files that are combined together into a single chunk for processing purposes. In some cases, the information within a document is related information and/or is packaged together within a distinct unit that includes metadata regarding such information.

Figure 3:
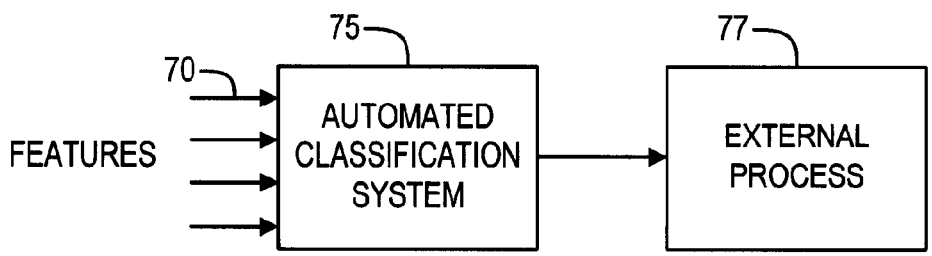
FIG. 3 is a block diagram illustrating a third representative context in which the present invention can operate.

FIG. 2 illustrates one example of an immediate real-time use of classification results, as opposed to the longer-term categorization of FIG. 1. Classification for immediate use can be employed beyond the information-providing context shown in FIG. 2, so as to encompass a wide variety of different contexts involving real-time activity, e.g., as illustrated in FIG. 3. In the particular context shown in FIG. 3, various features 70 are input into an automated classification system 75 (implementing a technique according to the present invention) which then classifies the features 70 and uses the resulting classification(s) to control some external process 77. In these embodiments, the information 70 that is input sometimes will not ordinarily be thought of as a "document", but rather as a set of values. Such values could be measurements that might pertain to a document, but also (or instead) might be other kinds of physical measurements and/or parameters.

Thus, for example, in one embodiment the features 70 correspond to measured or identified features in an input image (e.g., attention points, edges, relationships between attention points and/or edges, and/or any functions of the foregoing) and the categories correspond to different image objects (e.g., human face, car, house, tree, dog, etc.). In this embodiment, the external process 77 that is controlled by the categorizations made by classification system 75 can include additional image processing or any other kind of processing.

In an alternate embodiment, the input features 70 correspond to measured environmental parameters (e.g., from video, audio, infrared or ultrasonic sensors), the categorizations correspond to different environmental states, and the external process 77 is a robotic-control process. Generally speaking, the techniques of the present invention can be applied in any situation where a set of features is to be classified, and the resulting classification then used, e.g., to designate a corresponding document for future purposes, to provide informational feedback, to control another process and/or to perform any other action.

One aspect of the preferred embodiments of the present invention is the use of a classifier index. Generally speaking, such an index is organized so as to be searchable by individual features and lists, for each such individual feature, all of the available automated classifiers for which the input feature is highly predictive of a positive classification, relative to other potential features used by such classifiers. It is noted that the present invention generally emphasizes features that have high positive predictiveness values, i.e., that presence of the feature in an object relatively strongly implies that the corresponding classifier will determine that the object belongs in the subject category. The reason for this focus is that the index is used in the preferred embodiments of the present invention to limit the number of classifiers that are to be applied, and using features with relatively high positive predictiveness values almost always eliminates more classifiers than using features with relatively high negative predictiveness values.

Figure 4:
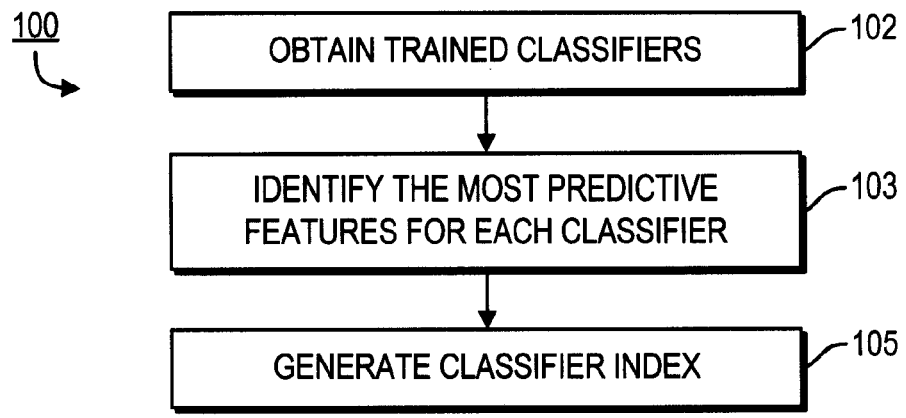
FIG. 4 illustrates a flow diagram of a process for generating a classifier index.

An exemplary process 100 for generating such an index for use in the preferred classification techniques of the present invention is illustrated in FIG. 4. In the preferred embodiments, the steps of the process 100 are performed in a fully automated manner so that the entire process 100 can be performed by executing computer-executable process steps from a computer-readable medium (which can include such process steps divided across multiple computer-readable media), or in any of the other ways described herein.

Initially, in step 102 trained classifiers are obtained. As indicated above, such classifiers preferably are binary and output matching scores between input feature vectors and their corresponding categories. Typically, such classifiers will have been trained using labeled training samples, generating feature vectors from those samples and then executing a conventional training process, with the specific training process preferably depending upon the kind of classifier. The present invention can be used with many kinds of classifiers. However, as noted below, it generally is preferable to use automated classifiers that provide predictiveness values for the individual features of the feature vectors on which they operate.

In step 103, the most predictive features are selected for each classifier. In embodiments where the classifier explicitly assigns predictiveness values to the features it uses, this step preferably is performed in a straightforward manner, i.e., selecting the features having the highest predictiveness values assigned by the subject classifier. Techniques for handling situations where the classifiers do not explicitly provide such predictiveness values are discussed below.

Different criteria for selecting the number of features to associate with each classifier can be used in different embodiments of the invention. For example, in one embodiment the N most predictive features are selected for each classifier, where N is a predetermined constant that is the same for each classifier. Selecting N provides an opportunity for a tradeoff. Smaller N leads to fewer hits and less processing overhead, but with lower recall (the percentage of relevant documents returned, i.e. true positives/(true positives+false negatives)). Larger N leads to greater recall and more processing effort. However, given the simple word count statistics from the training set or pseudo-training set (discussed below) or estimated directly from the index search engine (e.g., Lucene makes this quickly available at low cost), it is possible to quickly estimate the number of documents that will be recalled by adding additional terms, ignoring co-occurrence. For example, a decision to exclude a feature that occurred in only 1% of the positive training (or pseudo-training) documents is likely to cause less than or equal to about 1% loss in recall. If that feature occurred in x % of the negatives and positives together, it is a straightforward matter to estimate the additional computational and network resources that will be spent or saved by including or excluding the subject feature. Thus, it is possible to make an informed choice about N, given the relative cost of additional processing compared to additional false negatives (loss of recall). Although informed, such simple decision heuristics generally cannot account for correlation among the features in the overall disjoint query.

In another embodiment, all features having a predictiveness values that exceed a specified threshold for a given classifier are selected for the classifier (e.g., with the threshold being constant across all classifiers). In a still further embodiment, all of the most predictive features that together are estimated to make up a specified percentage of the classifier's overall prediction accuracy (e.g., excluding feature correlation considerations) are included (in certain sub-embodiments, excluding features whose predictiveness values does not exceed a specified minimum threshold).

In step 105, the features identified in step 103 for each of the classifiers are added into a feature/classifier index. Thus, as shown graphically in FIG. 5, relatively few features are selected for each classifier (e.g., features 312, 304 and 331 for classifier 201 and features 304, 325 and 370 for classifier 202) and then each classifier is added into index 120 in association with its corresponding selected features.

Figure 6:
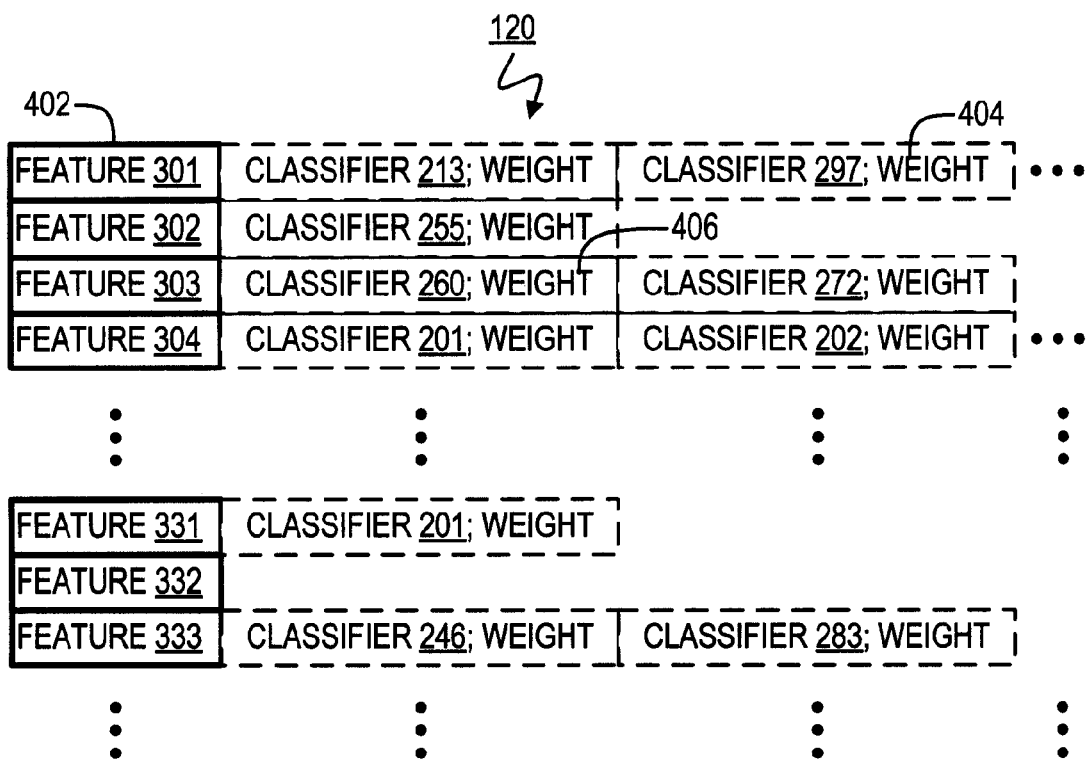
FIG. 6 illustrates an example of a classifier index.

An exemplary classifier index 120 is illustrated in FIG. 6. Queries against the index 120 preferably are made by specifying individual features 402, which preferably are sorted and/or otherwise arranged within index 120 so as to enable quick identification of any specified feature 402. Associated with each such feature 402 within index 120 are all of the classifiers for which that particular feature 402 was identified as one of the most predictive features. Accordingly, each feature 402 preferably has associated with it one or more classifiers.

Figure 5:
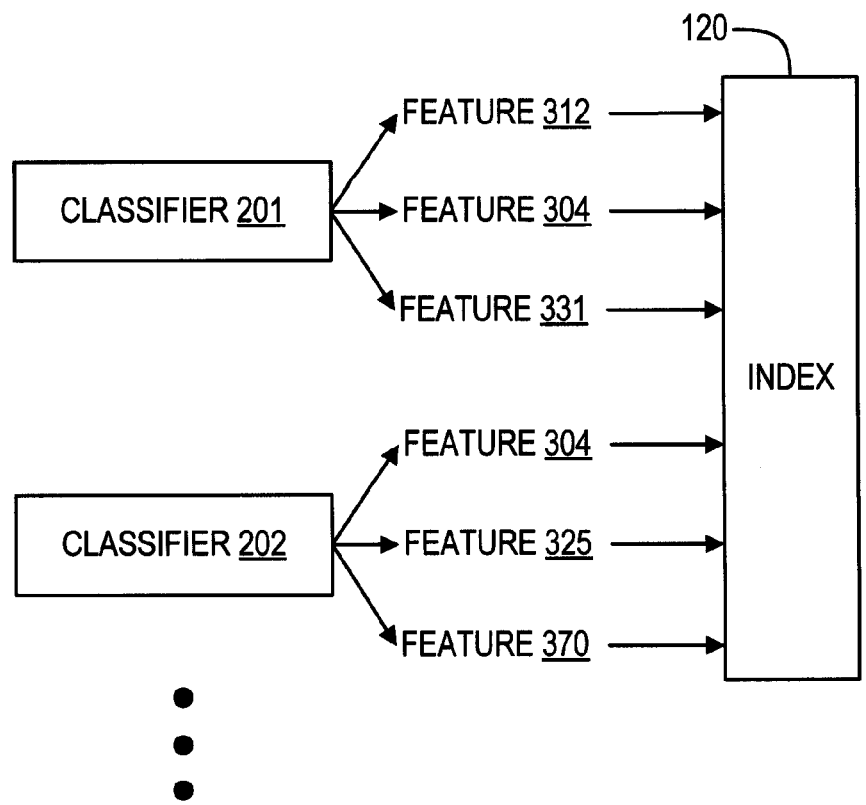
FIG. 5 is a block diagram conceptually illustrating the construction of a classifier index.

For example, submitting feature 302 to index 120 returns only classifier 255. However, submitting feature 304 returns classifiers 201 and 202 (because feature 304 was identified for each such classifier, as shown in FIG. 5), together with any other classifiers for which featured 304 was identified. In many embodiments, such as embodiments in which the features are individual words in textual documents, there will be thousands of potential features, so that a large number of the features will have only one, two or some other small number of classifiers associated with it.

In certain embodiments, other information also is embedded into index 120, such as the predictiveness value (sometimes referred to as the "weight") that was determined for the feature 402 in the a classifier that is listed for that feature. Thus, for example, entry 404 indicates the predictiveness value of feature 301 in classifier 297, and entry 406 indicates the predictiveness value of feature 303 in classifier 260. Techniques for using these embedded predictiveness values are discussed in more detail below.

Figure 7:
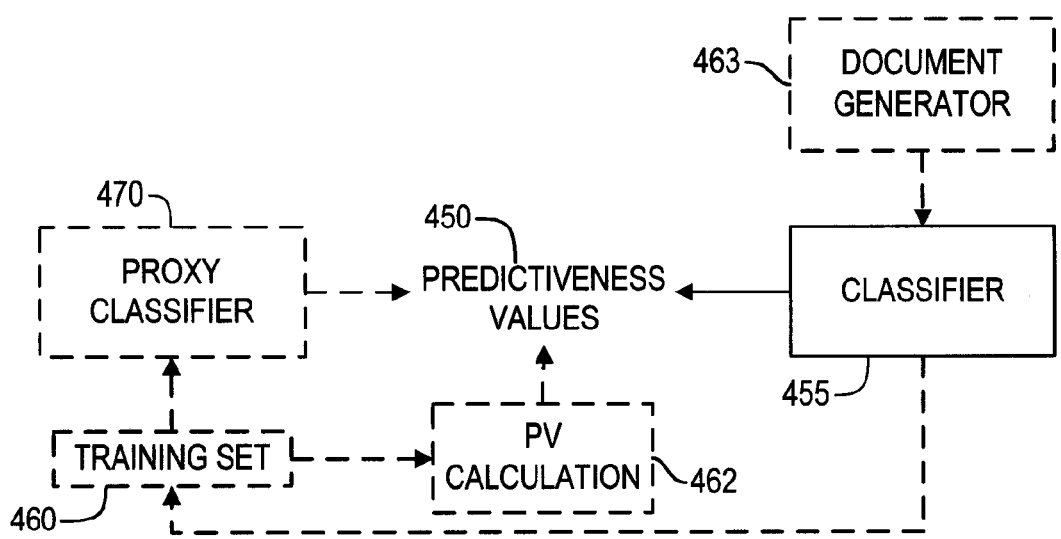
FIG. 7 is a block diagram illustrating several potential approaches to obtaining predictiveness values.

Exemplary approaches to obtaining the predictiveness values 450 (which are used to construct index 120 and, as noted above, may be embedded into index 120) for a given classifier 455 are illustrated in FIG. 7. As noted above, the most straightforward way to obtain predictiveness values 450 is to take them directly from classifier 455, assuming classifier 455 explicitly generates them as part of its machine-learning process.

However, in certain cases, predictiveness values 450 for the individual features (e.g., terms or words) are not provided by classifier 455. This often will be the case, e.g., where classifier 455 is a nonlinear classifier. In such embodiments, predictiveness values 450 preferably are identified in these embodiments in any of a variety of different ways, such as any of the following.

In a first representative embodiment, predictiveness values 450 are calculated 462 based directly on a training set 460. In this embodiment, training set 460 can include the training set that was used to train classifier 455 and/or a pseudo-training set that is generated by classifier 455. Such a pseudo-training set can be generated, e.g., by using a document generator 463 to generate or select documents (e.g., randomly) which are then classified by classifier 455, with the assigned classifications being used as labels. In any event, training set 460 typically will include a number of feature sets (e.g., each representing a different document) and a label for each feature set. Based on this information, predictiveness values 450 are calculated in the present embodiment for the individual features (e.g., within predictiveness-value calculation module 462) using any of a variety of feature-scoring metrics, such as Information Gain, Chi Squared or signed Bi-Normal Separation (BNS).

In a second embodiment, the training set 460 (again, including the original training set for classifier 455 and/or a pseudo-training set) is provided to train a proxy classifier 470 that does in fact generate predictiveness values as for the various features in the feature set (e.g., a linear SVM or Naïve Bayes classifier). Those values preferably are then just used directly as the predictiveness values 450. The preferred implementation of this embodiment is to use feature selection (e.g., an existing feature-selection technique) to select a few (e.g., 10 to 200) important features, and then to train the proxy classifier 470 to determine the predictiveness values for those features.

In certain embodiments of the invention, the feature sets used by classifier 455 will include features that cannot be searched through the index 80, such as non-textual features and certain textual features that are more complicated than simple existence of a word or term within a document (e.g., existence of a particular term within the Subject line of an e-mail message). In other embodiments, a goal is to create a system that is compatible with a wide range of search engines and indexes. In either such case, the non-supported features preferably are simply eliminated from consideration.

Figure 8:
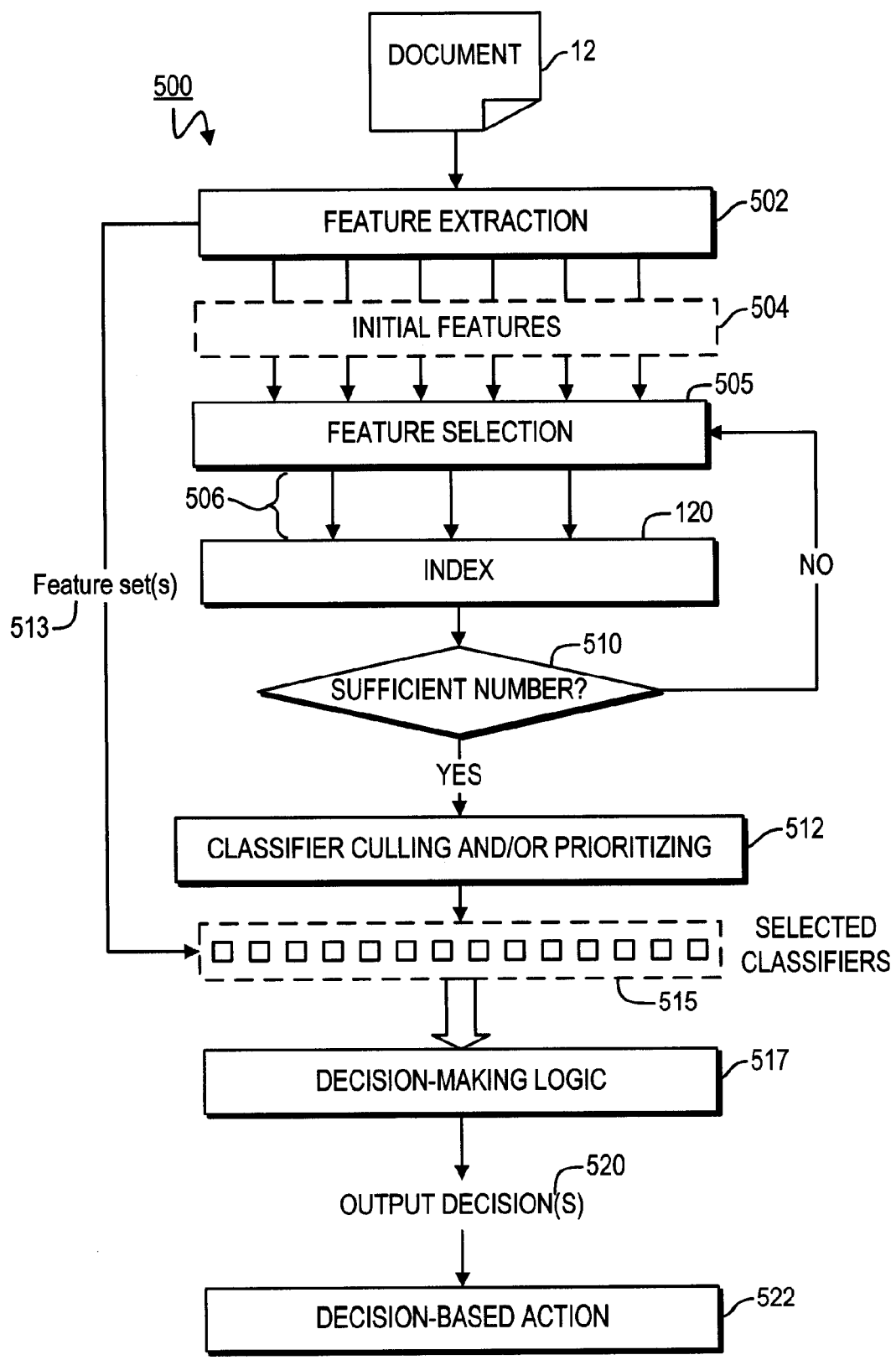
FIG. 8 is a block diagram of a classification and decision-making system.
Figure 9:
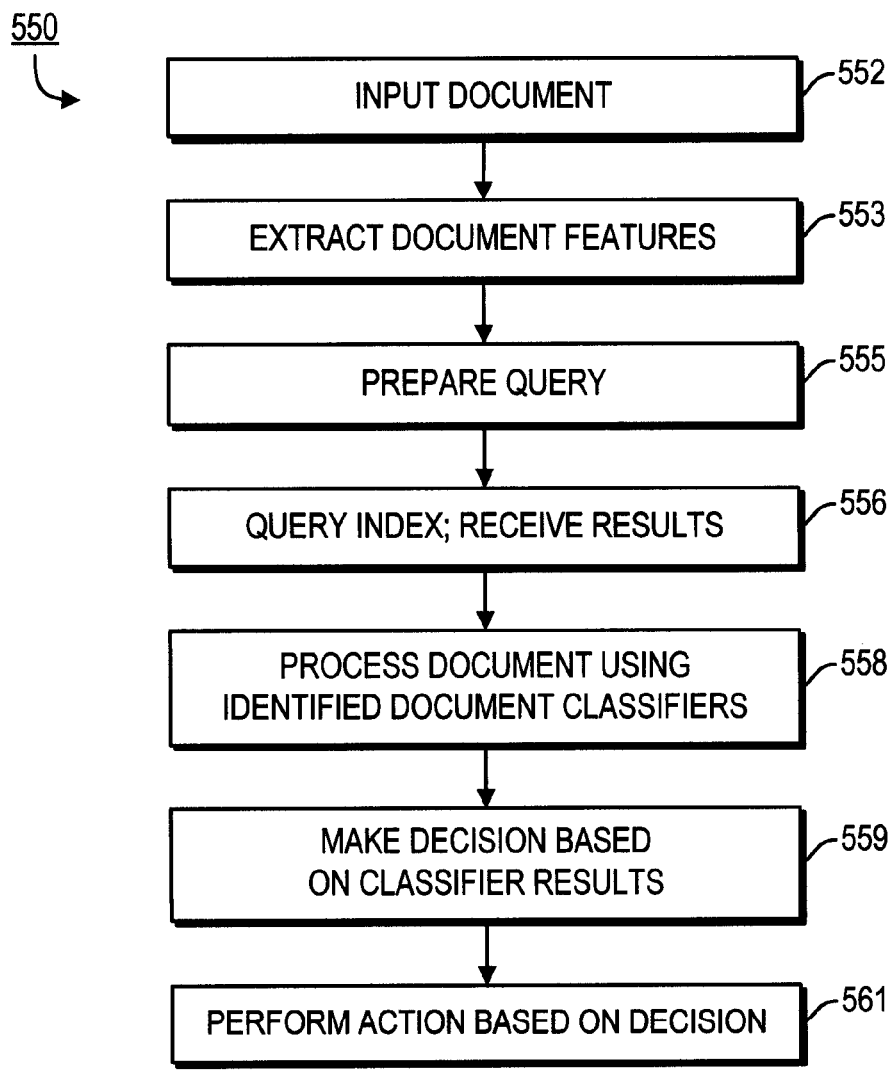
FIG. 9 is a flow diagram illustrating a document-based classification and decision-making process.

FIG. 8 is a block diagram of a classification and decision-making system 500 according to a representative embodiment of the present invention, and FIG. 9 is a flow diagram of a process 550 for classifying and decision-making, e.g., using system 500. Although the following discussion generally assumes that process 550 is implemented using system 500, it should be noted that either of system 500 or process 550 can be used independently of the other. In the preferred embodiments, the steps of the process 550 are performed in a fully automated manner so that the entire process 550 can be performed by executing computer-executable process steps from a computer-readable medium or in any of the other ways described herein.

Preferably, system 500 is configured so as to be able to input a document 12 from which a set of features 504 are extracted by extraction module 502, or to input the set of features 504 directly. In the present embodiment, a document 12 is input in step 552. As noted above, the document 12 can be any combination of information, but typically includes, in addition to a desired set of features 504, some extraneous information.

Accordingly, in step 553 the desired features 504 are extracted from the input document 12, e.g., using feature extraction module 502. For example, if the input document 12 is a text document, then the step 553 preferably extracts the significant words or phrases from the document 12 (e.g., excluding non-informative words such as "of", "the", "and", "probably" and the like and/or a using stemming, known synonyms and/or any other conventional techniques). In any event, only (or essentially only) features that exist within index 120 in association with one or more of the classifiers represented in index 120 preferably are extracted, and those features preferably are determined in the same (or substantially the same) way as they were determined for the purpose of generating the classifier training feature vectors.

As a result, the number of features 504 extracted preferably depends both upon the input document 12 and the content of index 120. When the document 12 is just a short search-engine query, just a couple of features 504 might be extracted, and when the document 12 is a long article, hundreds of features might be extracted.

Next, in step 555 a query is prepared based on the extracted features. The simplest query would be just the logical disjunction of all of the features extracted in step 552, i.e., $F_1$ OR $F_2$ OR . . . OR $F_n$.

However, in many cases such an approach would result in too many classifiers being returned. Therefore, in system 500 a subset of the initial features 504 is selected by feature selection module 505. Such selection preferably is performed based on information concerning index 120, e.g., information indicating how many classifiers are associated with each feature. Then, for example, in certain embodiments features that are associated with more than a specified threshold number of classifiers (e.g., more than 100, 500, 1,000 or 5,000 classifiers, depending upon the embodiment) are excluded, or the features having the highest number of associated classifiers are excluded until the expected number of classifiers to be returned falls below a specified threshold (although the actual number may differ because multiple different features can be associated with the same classifier). One advantage of the use of a fixed threshold (i.e., the first approach) is that the "stopwords" can be determined in advance for the entire index and then simply filtered out from the extracted features. Of course, it is possible to simply eliminate those "stopwords" from the index 120 in the first instance; however, doing so would preclude use of the query-widening strategy discussed below.

In addition to (or instead of) considering the index 120, in certain embodiments of the invention this step 555 considers the prominence of the features within the document. For example, in certain embodiments features are more likely to be selected by module 505 if they occur frequently or if they occur in a highly relevant field (to the extent that different fields exist and can be distinguished in the document 12), such as the subject field of an e-mail message or the title of the article. For example, for text documents 12, in certain embodiments this step 555 includes a keyword-extraction algorithm.

Once any paring down of the initial set of extracted features 504 has been performed, the query preferably is constructed as the simple logical disjunction of all of the remaining features 506. In step 556, this query is submitted to the index 120 and the set of matching classifiers is received.

In the present embodiment, system 500 implements a widening strategy in certain cases, depending upon the results returned from index 120. More preferably, a determination 510 is made as to whether the number of returned classifiers is at least a specified minimum threshold. If not, processing returns to module 505 where additional features (e.g., features that previously were selected out) are added to the query, preferably starting with those features that have the fewest number of classifiers associated with them and then selecting the number of additional features that are projected to reach the target minimum number of classifiers. This process can be repeated multiple times until the minimum is in fact achieved, with the classifiers identified from the earlier queries against the index 120 potentially being applied (as discussed below) while additional classifiers are identified. For the purpose of performing such multiple query iterations, certain embodiments of the invention use multiple levels of stopwords (e.g., a first level that includes any features having more than 100 classifiers associated with them, a second level that includes any features having more than 500 classifiers associated with them, and so on), with the higher-level stop words being included at each subsequent iteration. However, where processing speed is important, it generally is preferable to perform no more than one additional query. Also, any excess results can be pared down and/or prioritized.

For example, in certain embodiments of the invention, system 500 includes a module 512 for culling and/or prioritizing the return set of classifiers. Preferably, such operations are performed only if the number of returned classifiers exceeds some specified threshold maximum, which threshold can be set dynamically based on the processing load of the system. For example, in embodiments where real-time content is to be delivered to a user 40, application of the classifiers preferably is performed in parallel, so the number of classifiers that are to be applied can depend upon the number of available processors.

For purposes of such culling and/or prioritization, module 512 preferably assigns a score to each returned classifier. Each such score preferably is based on the features that retrieved the classifier and the predictiveness values for those features, as indicated in index 120. For example, a simple score calculation is simply to add up the predictiveness values associated with the classifier for each feature that retrieved the classifier. Alternate embodiments normalize and/or otherwise process the scores before combining them. In any event, the scores preferably are sorted from highest to lowest, and then the classifiers are selected for application in that order, or only the classifiers having the top M scores, e.g., where M is equal to the number of processors that are available to be allocated to the present task, are applied.

In any event, in step 558 the input document 12 is processed by each identified classifier 515 (e.g., each classifier that was selected by module 512). For this purpose, one or more feature sets 513 preferably are extracted from the document 12 and input into each such classifier 515. This step 558 preferably just involves multiple individual instances of a conventional application of a supervised classifier, and so no detailed description is required. However, it is noted that the feature set(s) 513 that are extracted from the document 12 preferably are tailored to the individual classifiers 515 and therefore often will not be the same as the extracted features 504 from which the index query is constructed. At the very least, the individual classifiers 515 typically expect as input a specifically ordered set of features (i.e., a feature vector) upon which they operate, while the extracted features 504 ordinarily need not be in any particular order. As indicated above, all of the classifiers 515 preferably output a real-valued score indicating the degree of match to a corresponding category. It is noted that feature extraction module 502, although shown as a single component, actually may be divided into different components, e.g., one to produce the initial query features 504 and another to produce the feature vectors for the selected classifiers 515.

In step 559, a decision is made (e.g., using decision-making logic 517) based on these classifier outputs. The particular decision ordinarily will depend upon the specific embodiment. For example, if the embodiment calls for returning three advertisements to a user 40 in real time, then the decision preferably involves selecting the three best advertisements to be returned, which decision can be made by simply selecting the three categories having the highest classifier values (keeping in mind that multiple classifiers can apply to a single category, in which case the classifier outputs for the same category preferably are combined to provide a single overall category score). Alternatively, if the embodiment calls for categorizing the input document, then some number of categories preferably are selected based on the classifier outputs, e.g., by selecting all categories whose corresponding classifier outputs (or combined classifier outputs where multiple classifiers pertain to a single category) exceed a specified threshold.

Alternate embodiments use various kinds of decision-making logic. For example, if the available categories are arranged in a hierarchical manner, then the decision-making logic preferably considers the degree attached to individual categories as well as the degree of match to higher-level as areas of subject matter to which those individual categories belong.

Finally, in step 561 an appropriate action is performed (e.g., in module 522) based on the output decision(s) 520. Ordinarily, this step 561 will be fairly straightforward based on the decision that has been made in step 559 (e.g., actually delivering the advertisements or other information to the user 40 or tagging the input document 12 with the determined categories and storing such information in a computer database for later access).

Figure 10:
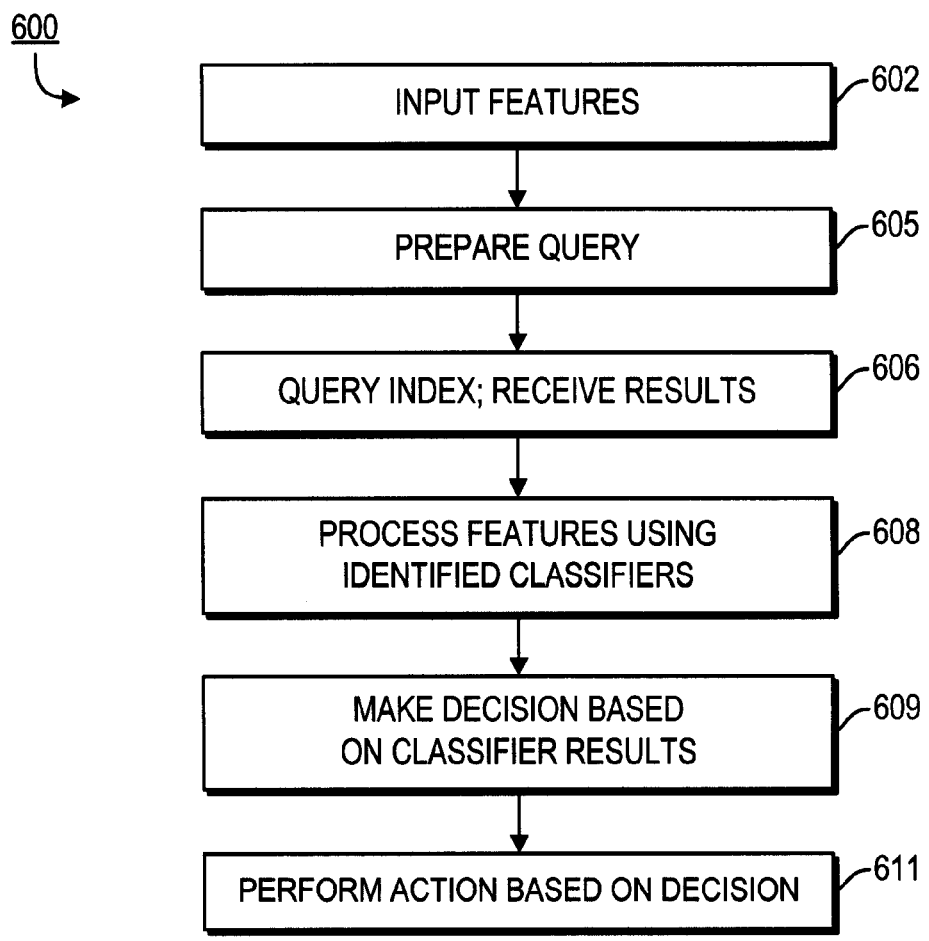
FIG. 10 is a flow diagram illustrating an information-based classification and decision-making.

FIG. 10 is a flow diagram illustrating an information-based classification and decision-making process 600 according to a representative embodiment of the present invention. Once again, although the following discussion generally assumes that process 600 is implemented using system 500, it should be noted that either of system 500 or process 600 can be used independently of the other. Preferably, the steps of process 600 are performed in a fully automated manner so that the entire process 600 can be performed by executing computer-executable process steps from a computer-readable medium or in any of the other ways described herein.

Initially, in step 602 a number of features (e.g., features 504) are input. In different embodiments of the invention, such features might be measured parameters and/or features provided by some other automated process. However, unlike embodiments in which a document 12 is input, the features input in this step 602 typically will not include extraneous information from which an appropriate feature set must be extracted.

In step 605, an index query is prepared. Preferably, this step and the considerations pertaining to it are substantially identical to step 555, discussed above. Accordingly, step 605 can include, e.g., selection of a smaller subset of the input features and/or one or more preliminary index-query iterations.

In step 606, the query is submitted and a list of matching classifiers is received in response. Preferably, this step 606 and all of the considerations pertaining to it are substantially identical to step 556, discussed above.

In step 608, the input features (or some subset of them) are processed by some or all of the identified classifiers. Generally speaking, this step 608 and the considerations pertaining to it are substantially identical to step 558, discussed above. For example, the input features may be pared down and/or organized as appropriate for the individual classifiers that are to be applied.

In step 609, a decision is made based on the classifier outputs. Generally speaking, the considerations that apply to this step 609 are substantially identical to those discussed above in connection with step 559. However, the particular kinds of decisions to be made often will be different in this category of embodiments. Here, the ultimate action to be taken is to provide some information to the user 40 (which may be a person or an automated process) and/or to control some external automated process. For that purpose, the relevant categories often will correspond to different characterizations of the set of input feature values. Accordingly, the decision often will involve determining which characterization is most appropriate. The mechanics of making such a decision, however, preferably are the same as in the category of embodiments discussed above in connection with process 550. That is, the classifier outputs are evaluated in the category or categories having the highest overall score is/are selected.

Finally, in step 611, the appropriate action is taken based on the decisions made in step 609. For example, if a decision has been made that a dangerous condition exists (e.g., based on a number of sensor value readings), then a warning signal might be provided to the user 40 and/or an automated shutdown process might be initiated, e.g., according to a pre-specified schedule and/or based on other inputs.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of document-based processing, comprising:
   inputting a document;
   extracting features from the document;
   querying an index using at least a subset of the extracted features and, in response, receiving identifications for selected document classifiers from a larger pool of document classifiers;
   processing, by a system having a central processing unit, the document using individual ones of the selected document classifiers, thereby generating corresponding classifier outputs; and
   based on the classifier outputs, at least one of (1) categorizing the document and (2) providing feedback information to a user.

2. The method according to claim 1, wherein said querying excludes at least a given one of the extracted features that is associated with a larger number of the document classifiers in the index than other ones of the extracted features.

3. The method according to claim 2, further comprising:
   determining that an insufficient number of document classifiers have been selected in response to said querying; and
   in response to said determining, repeating said querying using a larger set of the extracted features.

4. The method according to claim 1, wherein the index lists different features and, for each individual one of said different features, a corresponding at least one of the document classifiers of the larger pool.

5. The method according to claim 4, wherein for each said individual one of said different features, each listed corresponding document classifier is paired with a predictiveness indicator indicating how predictive said respective individual feature is for said listed document classifier.

6. The method according to claim 5, further comprising culling the selected document classifiers based on their predictiveness indicators to provide a reduced set of the selected document classifiers for processing the document.

7. The method according to claim 1, wherein content is delivered to a user in real time based on the classifier outputs.

8. The method according to claim 1, further comprising inserting into the index an association between a specified document classifier and selected features, the selected features constituting a subset of the features that are evaluated by the specified document classifier and having been selected based on their positive predictiveness of a particular category.

9. The method according to claim 1, wherein the larger pool of document classifiers comprises binary classifiers that output a score pertaining to a degree of match to a corresponding category.

10. A method of information-based processing, comprising:
receiving a set of features;
querying an index using at least a subset of the features, and selecting, based on at least the subset of the features, classifiers from a larger pool of supervised classifiers identified by the index;
processing, by a system having a central processing unit, the set of features by individual ones of the selected classifiers, and generating corresponding classifier outputs in response to the processing; and
based on the classifier outputs, selecting at least one category from among a plurality of categories.

11. The method according to claim 10, wherein said querying excludes at least a given one of the features in the set that is associated with a larger number of the supervised classifiers identified by the index than other ones of the features in the set.

12. The method according to claim 11, further comprising:
determining that an insufficient number of classifiers have been selected in response to said querying; and
in response to said determining, repeating said querying using a larger set of the features in the set.

13. The method according to claim 10, wherein the index lists different features and, for each individual one of said different features, a corresponding at least one of the supervised classifiers.

14. The method according to claim 13, wherein for each said individual one of said different features, each listed corresponding supervised classifier is paired with a predictiveness indicator indicating how predictive said respective individual feature is for said listed supervised classifier.

15. The method according to claim 14, further comprising culling the selected classifiers based on their predictiveness indicators to provide a reduced set of the selected classifiers for processing the set of features.

16. The method according to claim 10, further comprising inserting into the index an association between a specified supervised classifier and selected features, the selected features constituting a subset of the features that are evaluated by the specified supervised classifier and having been selected based on their positive predictiveness of a particular category.

17. A non-transitory computer-readable medium storing computer-executable instructions that upon execution cause a system having a processor to:
extract features from a document;
query an index using at least a subset of the extracted features, and select, based on at least the subset of the extracted features, document classifiers from a larger pool of document classifiers identified by the index;
process the document using individual ones of the selected document classifiers, and generate corresponding classifier outputs in response to the processing; and
based on the classifier outputs, at least one of (1) categorize the document and (2) provide feedback information to a user.

18. The computer-readable medium according to claim 17, wherein the index associates each of a plurality of features with a respective at least one document classifier, wherein a given one of the plurality of features is associated with multiple document classifiers.

19. The computer-readable medium according to claim 18, wherein the index associates a predictiveness indicator with each of the multiple document classifiers associated with the given feature, where each of the predictiveness indicators indicates predictiveness of the given feature for the corresponding one of the multiple document classifiers.

20. The method according to claim 1, wherein the index associates each of a plurality of features with a respective at least one document classifier, wherein a given one of the plurality of features is associated with multiple document classifiers.

21. The method of claim 1, wherein the document classifiers of the larger pool have been trained for respective categories using labeled training documents.

22. The method of claim 5, wherein the document classifiers of the larger pool have been trained for respective categories using labeled training documents, the method further comprising:
calculating values of the predictiveness indicators using the training documents.

23. The computer-readable medium of claim 17, wherein the document classifiers of the larger pool have been trained for respective categories using labeled training documents.

24. The computer-readable medium of claim 19, wherein the document classifiers of the larger pool have been trained for respective categories using labeled training documents, the instructions upon execution causing the system to further:
calculate values of the predictiveness indicators using the training documents.

* * * * *